(12) United States Patent
Nakazeki et al.

(10) Patent No.: US 8,347,648 B2
(45) Date of Patent: Jan. 8, 2013

(54) AIR CYCLE REFRIGERATING/COOLING SYSTEM AND TURBINE UNIT USED THEREFOR

(75) Inventors: Tsugito Nakazeki, Iwata (JP); Takayoshi Ozaki, Iwata (JP); Hiroyuki Yamada, Iwata (JP)

(73) Assignee: NTN Corporation, Osaka (JP)

( * ) Notice: Subject to any disclaimer, the term of this patent is extended or adjusted under 35 U.S.C. 154(b) by 1147 days.

(21) Appl. No.: 12/064,621

(22) PCT Filed: Aug. 23, 2006

(86) PCT No.: PCT/JP2006/316460
§ 371 (c)(1),
(2), (4) Date: Feb. 22, 2008

(87) PCT Pub. No.: WO2007/023835
PCT Pub. Date: Mar. 1, 2007

(65) Prior Publication Data
US 2009/0133431 A1    May 28, 2009

(30) Foreign Application Priority Data
Aug. 24, 2005   (JP) .................................. 2005-242007

(51) Int. Cl.
*F25D 9/00*     (2006.01)
*F04B 17/00*    (2006.01)
(52) U.S. Cl. ......................................... 62/402; 417/407
(58) Field of Classification Search .................... 62/401, 62/402; 415/229, 104; 60/605.3; 417/407; 384/317, 321, 476, 91, 103, 106
See application file for complete search history.

(56) References Cited

U.S. PATENT DOCUMENTS

| 2,352,206 A | * | 6/1944 | Kendall | .......................... 384/476 |
| 4,735,559 A | * | 4/1988 | Morishita et al. | .................. 418/2 |
| 5,310,311 A | * | 5/1994 | Andres et al. | .................. 415/229 |

(Continued)

FOREIGN PATENT DOCUMENTS
CN    1410732 A    4/2003
(Continued)

OTHER PUBLICATIONS

PCT English translation of the International Preliminary Report on Patentability and Written Opinion of the International Searching Authority, mailed Mar. 6, 2008, for PCT/JP2006/316460, 6 pages.

(Continued)

*Primary Examiner* — Kenneth Rinehart
*Assistant Examiner* — Timothy K Trieu
(74) *Attorney, Agent, or Firm* — Osha Liang LLP

(57) ABSTRACT

An air cycle refrigerating/cooling system includes a first heat exchanger for cooling air, a turbine unit that has a compressor for compressing the air and an expansion turbine for adiabatically expanding the air, and a second heat exchanger for cooling the air. A compressor rotor of the compressor and a turbine rotor of the expansion turbine are attached to a common main shaft in the turbine unit in such a manner that the turbine unit drives the compressor rotor with a power generated by the turbine rotor, and the main shaft is rotatably supported by a rolling contact bearing. A part or the entirety of a thrust force applied to the main shaft is supported by an electromagnet, and a pressure equalizing device for equalizing a gas pressure at opposite ends of the rolling contact bearing is provided.

12 Claims, 5 Drawing Sheets

U.S. PATENT DOCUMENTS

| | | | |
|---|---|---|---|
| 5,605,045 A * | 2/1997 | Halimi et al. | 60/607 |
| 5,709,103 A | 1/1998 | Williams | |
| 6,032,466 A * | 3/2000 | Woollenweber et al. | 60/607 |
| 6,050,103 A * | 4/2000 | Ko | 62/401 |
| 6,255,752 B1 | 7/2001 | Werner | |
| 6,558,139 B2 | 5/2003 | Nguyen et al. | |
| 6,662,575 B2 * | 12/2003 | Clarke | 62/87 |
| 7,793,499 B2 * | 9/2010 | Gutknecht | 60/605.3 |
| 2004/0252924 A1 * | 12/2004 | Kiuchi et al. | 384/492 |
| 2005/0126171 A1 * | 6/2005 | Lasker | 60/645 |
| 2006/0177333 A1 | 8/2006 | Sakuda et al. | |

FOREIGN PATENT DOCUMENTS

| | | |
|---|---|---|
| GB | 2 298 901 | 9/1996 |
| JP | 04-327021 A | 11/1992 |
| JP | 7-91760 | 4/1995 |
| JP | 7-259855 A | 10/1995 |
| JP | 8-261237 | 10/1996 |
| JP | 2623202 | 4/1997 |
| JP | 09-291832 A | 11/1997 |
| JP | 2000-97507 | 4/2000 |
| JP | 2000-121184 | 4/2000 |
| JP | 2003-222141 A | 8/2003 |
| JP | 2003-232366 A | 8/2003 |
| JP | 2004-183614 A | 7/2004 |
| WO | 2004/111458 | 12/2004 |

OTHER PUBLICATIONS

International Search Report for PCT/JP2006/316460 (Japanese and English) mailed Sep. 26, 2006 (4 pages).
Patent Abstracts of Japan 2000-121184 dated Apr. 28, 2000 (1 page).
Patent Abstracts of Japan 08-261237 dated Oct. 8, 1996 (1 page).
Patent Abstracts of Japan 2000-097507 dated Apr. 4, 2000 (1 page).
Patent Abstracts of Japan 07-091760 dated Apr. 4, 1995 (1 page).
Patent Abstracts of Japan 06-207755 filed Jul. 26, 1994 (1 page) (Relates to Foreign Reference 7 Above).
Nikkei Mechanical Magazine, "Cooling Air with Air" issued on Nov. 13, 1995, No. 467, pp. 46 to 52.
Office Action in Chinese Patent Application No. 200680030615.2 mailed Jun. 5, 2009, with partial English translation thereof (11 pages).
Office Action in Chinese Patent Application No. 200680030615.2 mailed Dec. 12, 2008, with partial English translation thereof (11 pages).
Office Action in Chinese Patent Application No. 200680030615.2 mailed Sep. 10, 2010 (4 pages).
Patent Abstract of Japan 07-259855, Dated Oct. 9, 2005 (1 Page).
Patent Abstract of China 02114677, Dated Apr. 16, 2003 (1 Page).
Patent Abstract of Japan 2004-183614, Dated Jul. 2, 2011 (1 Page).
Office Action in U.S. Appl. No. 12/064,614, Dated Mar. 23, 2011 (19 Pages).
Office Action in Japanese Application No. 2005-242007, Dated Jan. 18, 2011 (6 Pages With English Translation).
Patent Abstracts of Japan 09-291832, Dated Nov. 11, 1997 (1 Page).
Patent Abstracts of Japan 2003-232366, Dated Aug. 22, 2003 (1 Page).
Patent Abstracts of Japan 2003-222141, Dated Aug. 8, 2003 (1 Page).
Office Action Issued in U.S. Appl. No. 12/064,614, Dated Sep. 16, 2011 (11 Pages).
Office Action in Japanese Application No. 2005-239464, Dated Oct. 4, 2011 (6 pages with English Translation).
English Patent Abstract of JP04-327021, Published Nov. 16, 2011 (1 Pages).
Korean Office Action Issued in Korean Application No. 10-2008-7004895, Dated Oct. 5, 2012 (6 Pages With English Translation).

* cited by examiner

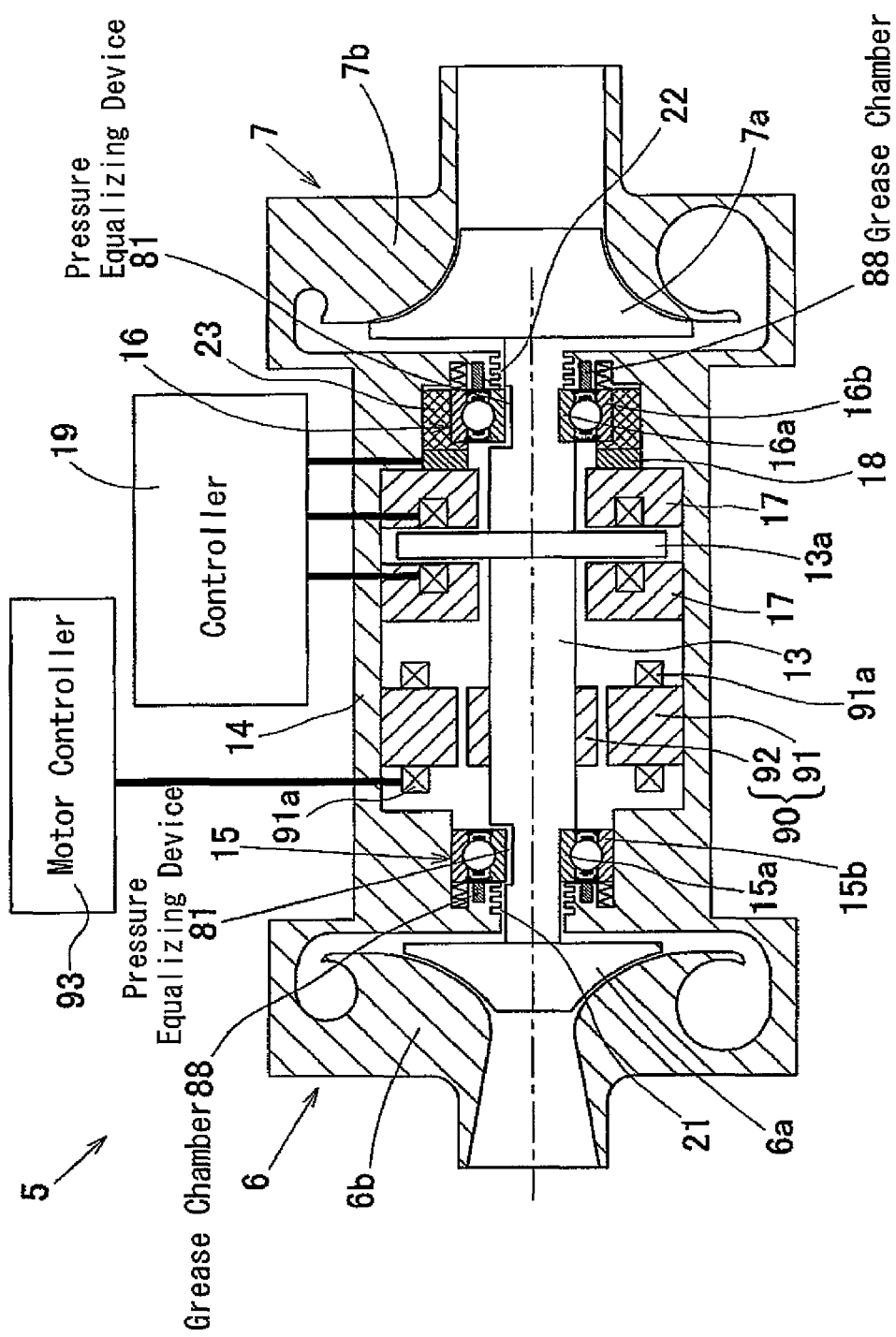

AIR CYCLE REFRIGERATING/COOLING SYSTEM AND TURBINE UNIT USED THEREFOR

BACKGROUND OF THE INVENTION

The present invention relates to an air cycle refrigerating/cooling system where air is used as a coolant and which is used in refrigerated warehouses, low temperature rooms at zero degrees or lower and for air conditioning, and to a turbine unit for air cycle refrigerating/cooling in such a system.

The use of air as a coolant is preferable from the point of view of environmental protection and safety, but does not provide sufficient properties in terms of energy efficiency in comparison with the case where chlorofluorocarbons, ammonium gas or the like is used. In the case where air is used as a coolant in a facility where it can be directly blown into, such as refrigerated warehouses, however, there is a possibility that the total cost can be lowered to that of the existing system by devising a means for omitting fans within a warehouse or defrosting systems. At present, the use of chlorofluorocarbons as a coolant has already been regulated from an environmental point of view, and it is also desired to avoid the use of other gases as a coolant as much as possible. Therefore, air cycle refrigerating/cooling systems in which air is used as a coolant in such applications as described above have been proposed (for example, Patent Document 1 and Non-Patent Document 1).

In addition, it has been stated that the theoretical efficiency of cooling with air becomes the same as or higher than that with chlorofluorocarbons or ammonium gas in a deeply cold range from $-30°$ C. to $-60°$ C. (Non-Patent Document 1). It has also been stated, however, that the above described theoretical efficiency of cooling with air can be attained only with peripheral apparatuses which are optimally designed. The peripheral apparatuses include a compressor, an expansion turbine and the like.

Turbine units where a compressor rotor and an expansion turbine rotor are attached to the same main shaft are used as the compressor and the expansion turbine (Patent Document 1, Non-Patent Document 1).

Here, magnetic bearing type turbine compressors where a turbine rotor is attached to one end of the main shaft, a compressor rotor is attached to the other end, and the above described main shaft is supported by a journal bearing and a thrust bearing, each bearing is controlled with a current through an electromagnet, have been proposed as a turbine compressor for processing a process gas (Patent Document 2).

In addition, a reduction in the thrust load which affects the rolling contact bearing through the use of a thrust magnetic bearing has been proposed for gas turbine engines in order to prevent the thrust load which affects the rolling contact bearing for supporting the main shaft from making the life of the bearing shorter (Patent Document 3).

Patent Document 1: Japanese Patent No. 2623202
Patent Document 2: Japanese Laid-open Patent Publication No. 7-91760
Patent Document 3: Japanese Laid-open Patent Publication No. 8-261237
Non-Patent Document 1: Nikkei Mechanical Magazine, "Cooling Air with Air," issued on Nov. 13, 1995, No. 467, pages 46 to 52

As described above, air cycle refrigerating/cooling systems require an optimally designed compressor and expansion turbine in order to attain the theoretical efficiency of air cooling, which becomes of a high efficiency in the deeply cold range.

As described above, turbine units where a compressor rotor and an expansion turbine rotor are attached to the same main shaft are used as the compressor and the expansion turbine. In these turbine units, the compressor rotor can be driven with the power generated by the expansion turbine, and thus, the efficiency of the air cycling refrigerator is increased.

In order to attain the efficiency for practical use, however, it is necessary to keep the gap between the rotors and the housing microscopic. Fluctuations of this gap prevent a stable high speed rotation, and thus, cause a reduction in the efficiency.

In addition, air which affects the compressor rotor and the turbine rotor makes the thrust force affect the main shaft, and thus, a thrust load is imposed on the bearing for supporting the main shaft. The rotational speed of the main shaft of the turbine unit in air cycle refrigerating/cooling systems is 80,000 to 100,000 rotations per minute, which is a very high speed in comparison with bearings for general applications. Therefore, thrust loads as described above cause the durability of the bearing for supporting the main shaft to decrease and the life to become shorter, and thus, decreases the reliability of the turbine unit for air cycle refrigerating/cooling. It is difficult to put a turbine unit for air cycle refrigerating/cooling into practice, and thus, put an air cycle refrigerating/cooling system into practice without solving the problem of the durability of the bearing as described above. The above described technologies disclosed in Patent Document 1 and Non-Patent Document 1, however, do not solve the problem where the durability of the bearing against the thrust load for such a high speed rotation decreases.

In such a magnetic bearing type turbine compressor as that of Patent Document 2 where the main shaft is supported by a journal bearing made up of a magnetic bearing and a thrust bearing made up of a magnetic bearing, the journal bearing does not have a function of restricting movement in the axial direction. Therefore, when there is an unstable factor in the control of the thrust bearing, it is difficult to provide a stable high speed rotation while keeping a microscopic gap between the above described rotors and housing. In the case of a magnetic bearing, there is also a problem of contact at the time of power failure.

In addition, in the case of a turbine unit for air cooling where the main shaft is rotatably supported by a rolling contact bearing and part or the entirety of the thrust force applied to this main shaft is supported by an electromagnet adjusted on the basis of the output of a sensor for detecting the thrust force, a lubricant for the rolling contact bearing disperses or dries due to the air flow around the unit, and thus, the durability of the bearing cannot be secured.

SUMMARY OF THE INVENTION

An object of this invention is to provide an air cycle refrigerating/cooling system and a turbine unit for the air cycle refrigerating/cooling where a longer operating life thereof can be achieved by increasing the durability of the rolling contact bearing for supporting the main shaft of the turbine unit, and thus, an increase in the reliability of the system can be achieved.

Another object of this invention is to achieve a stable high speed rotation while keeping the clearance between the respective rotors and the diffuser in the turbine unit minute, and thus, obtain high efficiency in compression and expansion.

The air cycle refrigerating/cooling system according to this invention includes a heat exchanger for cooling air, a turbine unit which has a compressor for compressing the air and an expansion turbine for adiabatically expanding the air, and another heat exchanger for cooling the air. In the air cycle refrigerating/cooling system unit, a compressor rotor of the compressor and a turbine rotor of the expansion turbine are attached to a common main shaft unit in such a manner that the turbine unit drives the compressor rotor with the power generated by the turbine rotor, and the main shaft is rotatably supported by a rolling contact bearing, and part or the entirety of the thrust force applied to this main shaft is supported by an electromagnet, and a pressure equalizing device for equalizing the gas pressure at opposite ends of the rolling contact bearing is provided.

The turbine unit for air cycle refrigerating/cooling according to this invention is a turbine unit which is used in the above described air cycle refrigerating/cooling system.

In the air cycle refrigerating/cooling system according to the present invention, intake air is compressed by a pre-compressing unit accompanied by elevated temperature and cooled by a heat exchanger. The cooled air is further compressed by the compressor in the turbine with the air temperature increased, and then is again cooled by another heat exchanger. This cooled air is cooled by another heat exchanger and led to the expansion turbine in the turbine unit so as to be cooled through adiabatic expansion to the target temperature, that is, a very low temperature of, for example, approximately −30° C. to −60° C., and then discharged.

The turbine unit where a compressor rotor and a turbine rotor in the above described expansion turbine are attached to the common main shaft drives the compressor rotor with the power generated in the turbine rotor, and therefore, requires no power source, and thus, allows the compact configuration to cool efficiently.

In the air cycle refrigerating/cooling system and the turbine unit for air cycle refrigerating/cooling according to this invention, the above described turbine unit may be driven by a motor having a motor rotor and a motor stator confronting the motor rotor. That is to say, a compressor rotor in the above described compressor, a turbine rotor in the above described expansion turbine and the motor rotor may be attached to the common main shaft so that the main shaft can be driven by means of a magnetic force generated by the motor stator, and thus, the above described compressor rotor may be driven in the above described turbine unit for air cycle refrigerating/cooling.

In the case where the main shaft is driven by the motor which is provided as that in the third aspect, it becomes unnecessary to provide a pre-compressing unit, such as a blower, in a stage before the compressor.

In either of the cases where the compressor rotor is driven by the power generated by the above described turbine rotor or by a motor for driving the main shaft, it is necessary to keep the gap between the rotors and the housing microscopic. It is important to secure this efficiency of the air cycle refrigerating/cooling system. In order to do so, the main shaft of the rotors is supported by a rolling contact bearing so that the position of the main shaft is restricted to a certain degree due to the function of restricting movement in the axial direction by the rolling contact bearing, and thus, the microscopic gap between the rotors and the housing can be kept constant. In the case of a rolling contact bearing having this function of restricting movement in the axial direction, such a problem arises that the durability decreases due to the above described thrust force applied to the bearing which rotates at high speed, and, however, since the thrust force is supported by an electromagnet, the durability of the rolling contact bearing can be secured. As described above, the main shaft is supported by a rolling contact bearing in the radial direction and the thrust force is supported by an electromagnet, and therefore, a stable high speed rotation of the main shaft can be achieved while keeping the rotor chip clearance minute.

According to this invention, in particular, a pressure equalizing device for making the gas pressure equal which affects opposite ends of the above described rolling contact bearing in the axial direction, and therefore, the following advantages are obtained.

That is to say, the main shaft is provided with the respective rotors rotating at high speed, and therefore, there is a great difference in the pressure between the opposite surfaces of each bearing in the axial direction, and this difference in pressure causes air leak even when the bearing is sealed, thereby inviting dispersion or drying of the grease. Such dispersion and drying of the grease can be prevented by the pressure equalizing device.

The pressure equalizing device may include a gap defined between the inner ring of the rolling contact bearing and the main shaft. Preferably, the pressure equalizing device may include a gap provided between an outer ring of the above described bearing and a member in contact with the outer ring or a communication passage within a member in contact with the outer ring. In either case, the pressure equalizing device can easily be obtained. The pressure equalizing device may include an air vent provided in the main shaft.

Preferably, the above described rolling contact bearing may be a type capable to sustain a relative position between the inner and outer rings in the axial direction, for example, a deep groove ball bearing. It may also be an angular contact ball bearing.

Preferably, the rolling contact bearing is a type of grease lubricant. In air cooling systems, air acting as the coolant is sent into the space to be cooled, such as a refrigerator, and therefore, in the case of an oil lubricant, there is a risk that a lubricant mist may pollute the cooling air. According to grease lubricant, polluting the cooling air can be suppressed.

In the case of the grease lubricant, it is preferable to provide a grease chamber in a member around the rolling contact bearing. The turbine unit for air cycle refrigerating/cooling provides high speed rotation, and furthermore, a high temperature gas flows on the output side of the compressor thereof, and therefore, the bearing temperature rises and there is a risk that the grease may run out quickly. When the grease chamber is provided in a member around the rolling contact bearing so that the grease stockpile is secured, the durability of the rolling contact bearing can be increased.

In the above described turbine unit, it is preferable to provide a non-contact seal, such as a labyrinth seal, for restricting a leakage between the compressor and the turbine. When the leakage between the compressor and the turbine is restricted, the gas flow around the rolling contact bearing can be reduced, and thus, the grease can be prevented from dispersing or drying.

BRIEF DESCRIPTION OF THE DRAWINGS

In any event, the present invention will become more clearly understood from the following descriptions of the preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 3Bb is a cross sectional diagram along line IIIb-IIIb in FIG. 3A;

FIG. 3Cb is a cross sectional diagram showing a modification which corresponds to the cross sectional diagram along line IIIb-IIIb in FIG. 3A;

FIG. 3Db is a cross sectional diagram showing another modification which corresponds to the cross sectional diagram along line IIIb-IIIb in FIG. 3A;

FIG. 5 is a cross sectional diagram showing the turbine unit for air cycle refrigerating/cooling according to the third embodiment.

DETAILED DESCRIPTION OF THE PREFERRED EMBODIMENTS

Figure 1:
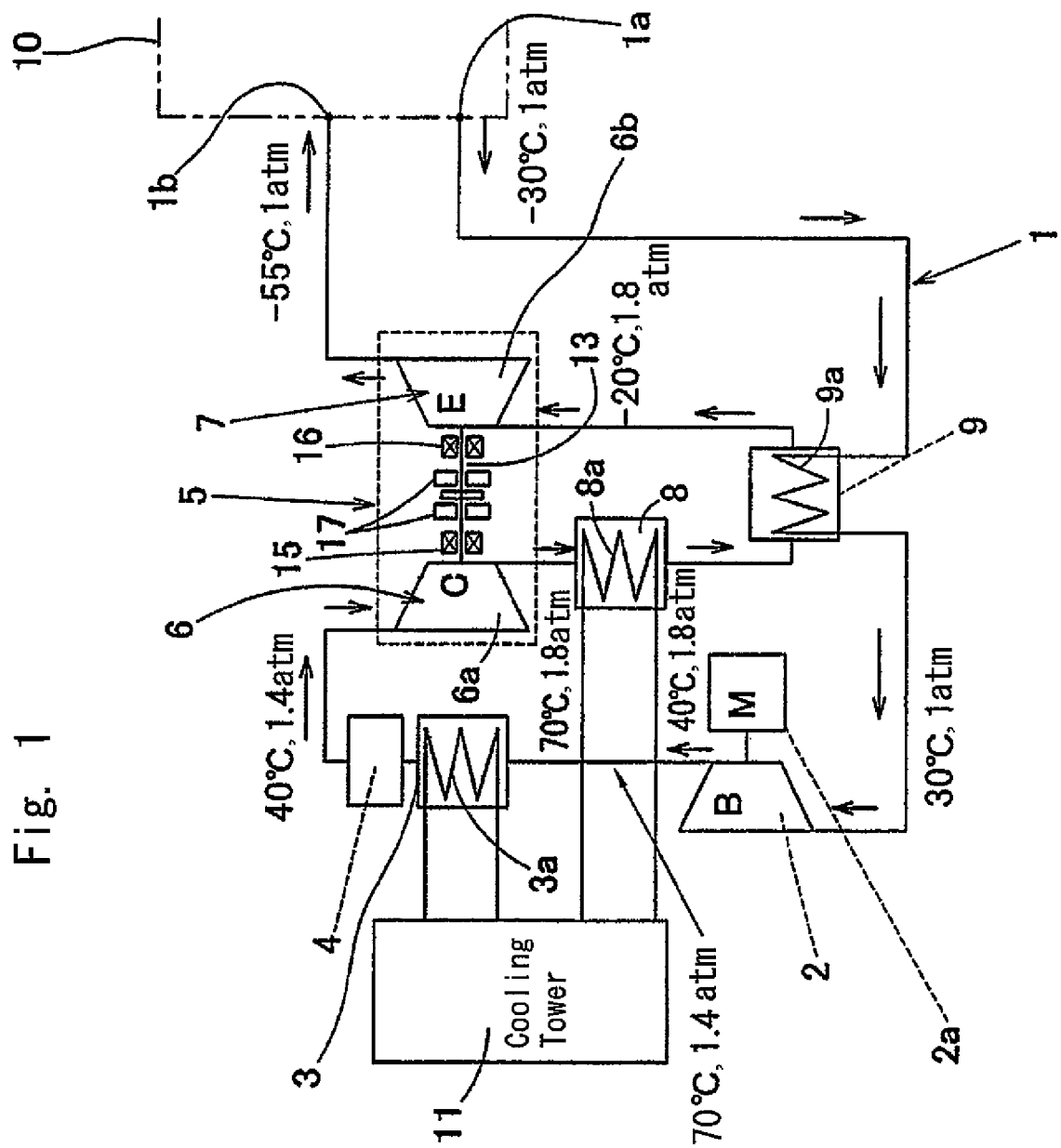
FIG. 1 is a system diagram showing the air cycle refrigerating/cooling system according to the first embodiment of this invention.
Figure 2:
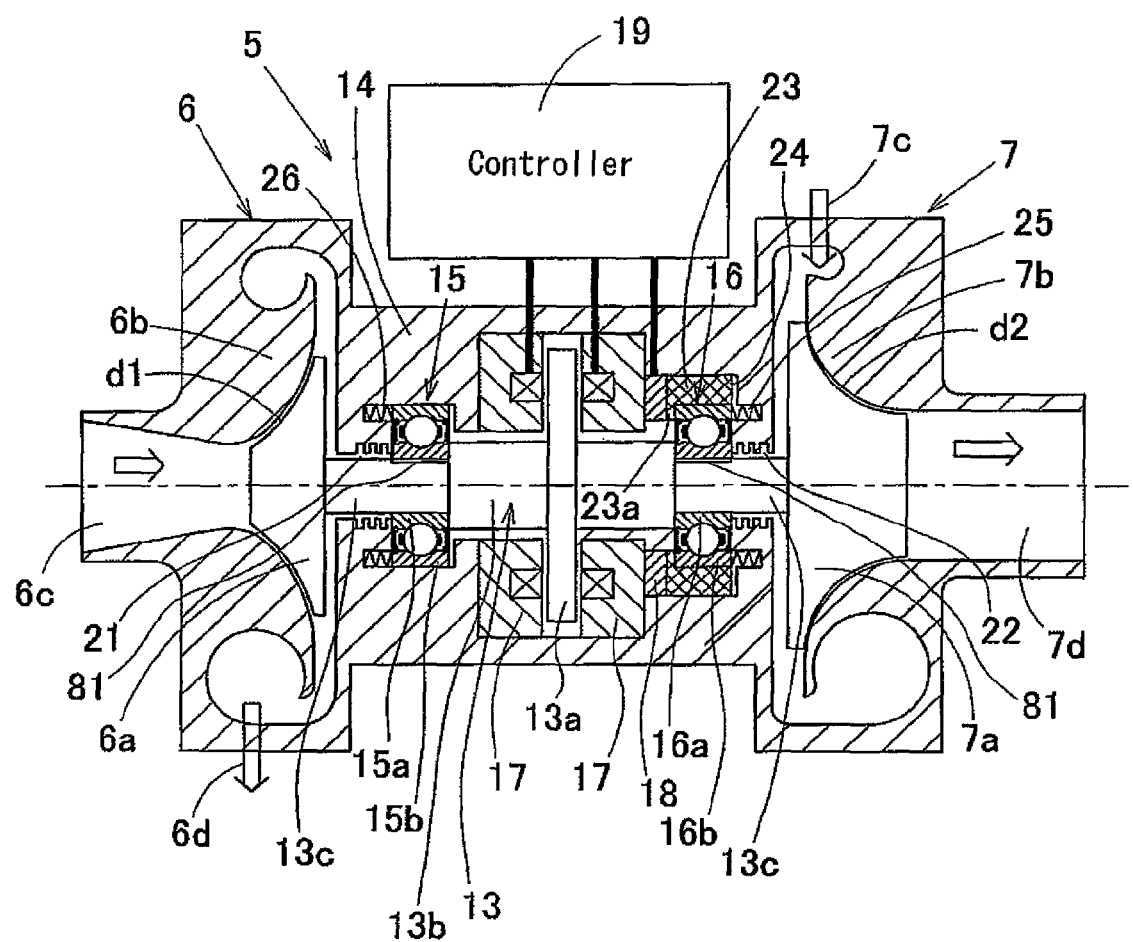
FIG. 2 is a cross sectional diagram showing a turbine unit for air cycle refrigerating/cooling used in the air cycle refrigerating/cooling system.

The first embodiment of this invention is described in reference to FIGS. 1 and 2. FIG. 1 shows the entire configuration of the air cycle refrigerating/cooling system. This air cycle refrigerating/cooling system is a system for cooling air in a space to be cooled 10, such as a refrigerator, directly as a coolant and has an air circulation path 1 that reaches from an air inlet 1a to an outlet 1b, which are respective openings in the space to be cooled 10. This air circulation path 1 is provided with a pre-compressing unit 2, a first heat exchanger 3, a dehumidifier 4, a compressor 6 in a turbine unit 5 for air cycle refrigerating/cooling, a second heat exchanger 8, an intermediate heat exchanger 9 and an expansion turbine 7 in the above described turbine unit 5 in this order. The intermediate heat exchanger 9 exchanges heat between an intake air in the vicinity of the inlet 1a that has flown into the air circulation path 1 and the air of which the temperature rises through the compression in the rear stage and which is then cooled, and thus, the air in the vicinity of the inlet 1a passes through a core 9a of the heat exchanger 9.

The pre-compressing unit 2 is made up of a blower or the like and driven by a motor 2a. The first heat exchanger 3 and the second heat exchanger 8, respectively, have heat exchangers 3a and 8a for circulating a coolant and exchange heat between the coolant, such as water, in the heat exchangers 3a and 8a and the air in the air circulation path 1. The heat exchangers 3a and 8a are respectively connected to a cooling tower 11 through pipes so that the coolant, of which the temperature has risen as a result of heat exchange, is cooled in the cooling tower 11.

This air cycle refrigerating/cooling system is a system where the space to be cooled 10 is kept between approximately 0° C. and −60° C., and air at approximately 0° C. to −60° C. under 1 normal atmosphere (1 atm) flows into the inlet 1a of the air circulation path 1 from the space to be cooled 10. Here, the numerals of the temperature and the air pressure shown in the following are examples which tentatively become a rough standard. The air that has flown into the inlet 1a is used by the intermediate heat exchanger 9 to cool the air in the rear stage of the air circulation path 1, and thus, the temperature rises to 30° C. The air of which the temperature has thus risen stays at 1 normal atmosphere, but is then compressed by the pre-compressing unit 2 to 1.4 normal atmosphere, and the temperature rises to 70° C. as a result of this compression. The first heat exchanger 3 only cools the air of which the temperature has risen to 70° C., and therefore, can efficiently cool the air with cold water of which the temperature is approximately room temperature, and thus, cools the air to 40° C. The dehumidifier 4 dehumidifies the air inside the path in order to prevent the moisture in the air within the air circulation path 1 from being cooled to a sub-zero temperature in the rear stage, which causes clogging in the air circulation path 1 or dragging of the expansion turbine 7.

The air at 40° C. of which the pressure is 1.4 normal atmosphere after dehumidification is compressed by the compressor 6 in the turbine unit 5 to 1.8 normal atmosphere so that the air becomes of a state where the temperature has risen to approximately 70° C. as a result of this compression, and then cooled to 40° C. by the second heat exchanger 8. This air at 40° C. is cooled to −20° C. by air at −30° C. in the intermediate heat exchanger 9. The air pressure is maintained at 1.8 normal atmosphere as the air is discharged from the compressor 6.

The air that has been cooled to −20° C. in the intermediate heat exchanger 9 is adiabatically expanded by the expansion turbine 7 in the turbine unit 5 so as to be cooled to −55° C., and then discharged to the space to be cooled 10 from the outlet 1b. This air cycle refrigerating/cooling system carries out such a refrigerating cycle.

FIG. 2 shows an example of a turbine unit 5 for air cycle refrigerating/cooling. This turbine unit 5 has a centrifugal compressor 6 and a radial flow expansion turbine 7 where the compressor rotor 6a of the compressor 6 and the turbine rotor 7a of the expansion turbine 7 are respectively attached to either end of the main shaft 13. In addition, the power generated by the turbine rotor 7a drives the compressor rotor 6a, and no other drive source is provided.

As hereinafter shown in FIG. 5, the compressor rotor 6a of the compressor 6, the turbine rotor 7a of the expansion turbine 7 and the motor rotor 92 may be attached to the same main shaft 13 so that the main shaft 13 is driven by the drive force of the motor 90. In the case where the motor 90 is provided so as to drive the main shaft 13, it becomes unnecessary to provide a pre-compressing unit 2 (FIG. 1), such as a blower, in the stage before the compressor 6.

In FIG. 2, the compressor 6 has a housing 6b which confronts the compressor rotor 6a via a minute clearance d1, and the air that has been taken in from an intake 6c in the center portion in the axial direction is compressed by the compressor rotor 6a and discharged from the outlet (not shown) in the outer peripheral portion, as shown by arrow 6d.

The expansion turbine 7 has a housing 7b which confronts the turbine rotor 7a via a minute clearance d2, and the air that has been taken in from the outer peripheral portion, as shown by arrow 7c, is adiabatically expanded by the turbine rotor 7a and discharged in the axial direction from the outlet 7d in the center portion.

In this turbine unit 5, the main shaft 13 is supported by a number of bearings 15 and 16 in the direction of the radii, and the thrust force applied to the main shaft 13 is supported by an electromagnet 17. This turbine unit 5 has a sensor 18 for detecting the thrust force which affects the main shaft 13 through the air inside the compressor 6 and the expansion turbine 7 and a controller 19 for controlling the support force by the above described electromagnet 17 on the basis of the output of this sensor 18. The electromagnet 17 is installed in a spindle housing 14 so as to face but not make contact with the two surfaces of a thrust plate 13a in flange form made up of a ferromagnetic body provided at the center of the main shaft 13.

The bearings 15 and 16 for supporting the main shaft 13 are rolling contact bearings having a function of restricting movement in the axial direction and, for example, deep groove ball bearings are used. Deep groove ball bearings have a function of supporting the thrust in the two directions and work to return the inner and outer rings to the neutral location in the axial direction. These two bearings 15 and 16 are placed in close proximity to the compressor rotor 6a and the turbine rotor 7a in the spindle housing 14, respectively.

The main shaft 13 is a shaft with steps having a large diameter portion 13b in the center portion and small diameter portions 13c in the two end portions. The bearings 15 and 16 on both sides have inner rings 15a and 16a, into which the small diameter portions 13c are fitted in a press fitting state, and one end face making contact with a surface on the step between the large diameter portion 13b and a small diameter portion 13c.

A pressure equalizing device 81 is provided in the portions of the main shaft 13 with which the bearings 15 and 16 are engaged. The pressure equalizing device 81 will hereinafter be described in detail in reference to FIG. 3.

The portions of the spindle housing 14 on the rotors 6a and 7a sides of the bearings 15 and 16 on the two sides are formed so as to have a diameter in such a manner that the inner surface is in close proximity to the main shaft 13, and non-contact seals 21 and 22 are formed on this inner surface. The non-contact seals 21 and 22 are labyrinth seals which are formed by aligning a number of circumferential trenches in the inner surface of the spindle housing 14 in the axial direction.

The sensor 18 is provided on the stationary side, that is to say, on the spindle housing 14, in close proximity to the bearing 16 of the turbine rotor 7a side. The outer ring 16b of the bearing 16, of which this sensor 18 is provided in the vicinity, is fixedly engaged within a bearing housing 23. The bearing housing 23 formed in ring shape has one end provided with an inner flange 23a which is engaged with the end face of the outer ring 16b of the bearing 16, and is moveably engaged within an inner diametric hole 24 provided in the spindle housing 14 in the axial direction. The inner flange 23a is provided at the end of the bearing housing 23 on the center side of the spindle housing 14 in the axial direction.

The turbine unit 5 having this configuration compresses the air which becomes the coolant in the air cycle refrigerating/cooling system with the compressor 5 so that the temperature rises and is used in order for the air that has been cooled in the heat exchangers 8 and 9 to be cooled to a target temperature, that is, a very low temperature, for example, approximately −30° C. to −60° C., through adiabatic expansion in the expansion turbine 7 and then discharged.

The compressor rotor 6a and the turbine rotor 7a are attached to the same main shaft 13, and the power generated by the turbine rotor 7a drives the compressor rotor 6a in this turbine unit 5, which requires no power source and can efficiently cool with a compact configuration.

In order to secure the efficiency in compression and expansion of this turbine unit 5, it is necessary to keep the gaps d1 and d2 between the rotors 6a and 7a and the housings 6b and 7b microscopic. It becomes important for the air cycle refrigerating/cooling system to secure this efficiency. As a means for achieving this, the main shaft 13 is supported by rolling contact type bearings 15 and 16, and therefore, the movement of the main shaft 13 in the axial direction is restricted to a certain degree due to the function of the rolling contact bearings of restricting movement in the axial direction, and thus, microscopic gaps d1 and d2 between the respective rotors 6a and 7a and the housings 6b and 7b can be kept at a constant distance.

However, a thrust force is applied to the main shaft 13 of the turbine unit 5 through the air pressure which affects the respective rotors 6a and 7a. In addition, the turbine unit 5 used in the air cooling system provides rotations at a very high speed, for example, approximately 80,000 to 100,000 rotations per minute. Therefore, when a thrust force affects the rolling contact bearings 15 and 16 which support the rotating main shaft 13 as described above, the durability of the bearings 15 and 16 is lowered.

In this embodiment, the above described thrust force is supported by the electromagnet 17, and therefore, the thrust force which affects the rolling contact bearings 15 and 16 for supporting the main shaft 13 can be reduced while preventing the torque from increasing due to a non-contact bearing. In this case, a sensor 18 for detecting a thrust force which affects the main shaft 13 through the air within the compressor 6 and the expansion turbine 7, and a controller 19 for controlling the supporting force with the above described electromagnet 17 on the basis of the output of this sensor 18 are provided, and therefore, the rolling contact bearings 15 and 16 can be used in such a state as to be optimal for the thrust force in accordance with the specification of these bearings.

In particular, the sensor 18 is placed in close proximity to the bearing 16, and therefore, the thrust force which affects the bearing 16 adversely can be directly measured with a high precision, and thus, precise control over the thrust force can be achieved.

Therefore, stable high speed rotations of the main shaft 13 can be attained while keeping appropriate gaps d1 and d2 vis-à-vis the respective rotors 6a and 7a, and the durability and the life of the bearings 15 and 16 can be increased. The durability of the bearings 15 and 16 increases, and therefore, as a whole, the reliability of the turbine unit 5 for air cycle refrigerating/cooling increases, and thus, as a whole, the reliability of the air cycle refrigerating/cooling system increases. In this manner, the stability of high speed rotations, the durability and the reliability of the main shaft bearings 15 and 16 in the turbine unit 5, which becomes an obstacle in the air cycle refrigerating/cooling system, increase, and therefore, the air cycle refrigerating/cooling system can be put into practice.

The bearings 15 and 16 are placed in close proximity to the compressor rotor 6a and the turbine rotor 7a, respectively, so that the main shaft 13 is supported at opposite ends, and therefore, a more stable high rotation can be achieved. In addition, the respective rolling contact bearings 15 and 16 is elastically supported by a resilient element 26 and is appropriately preloaded, and therefore, the location of the main shaft 13 is stable in the axial direction, and thus, the microscopic chip clearance d1 and d2 of the respective rotors 6a and 7a are kept so that a more stable high speed rotation can be obtained.

Non-contact seals 21 and 22 are provided to the portions between the main shaft 13 and the spindle housing 14 on the end portion sides of the respective bearings 15 and 16, and therefore, air can be prevented from passing through the bearings 15 and 16 and leaking between the compressor 6 and the expansion turbine 7. The difference in the air pressure between the inside of the compressor 6 and the inside of the expansion turbine 7 is great, and therefore, air tends to leak after passing through the inside of the respective bearings 15 and 16 and along the surface where the inner and outer rings 15a and 16a of the respective bearings 15 and 16 make contact with the main shaft 13 and the spindle housing 14. This air leakage lowers the efficiency of the compressor 6 and the expansion turbine 7, and there is a risk that the air that passes through the bearings 15 and 16 may make the inside of the bearings 15 and 16 dirty due to a dust, and the lubricant inside the bearings dry, and thus, may lower durability. Such a reduction in the efficiency and dirtiness of the bearings 15 and 16 can be prevented by the above described non-contact seals 21 and 22.

The pressure equalizing device 81 in FIGS. 3A to 3Db are described below. This turbine unit 5 includes the pressure equalizing device 81 for equalizing the air pressure applied to opposite sides of the respective bearings 15 and 16 for supporting the main shaft 13 in the axial direction.

Figure 3A:
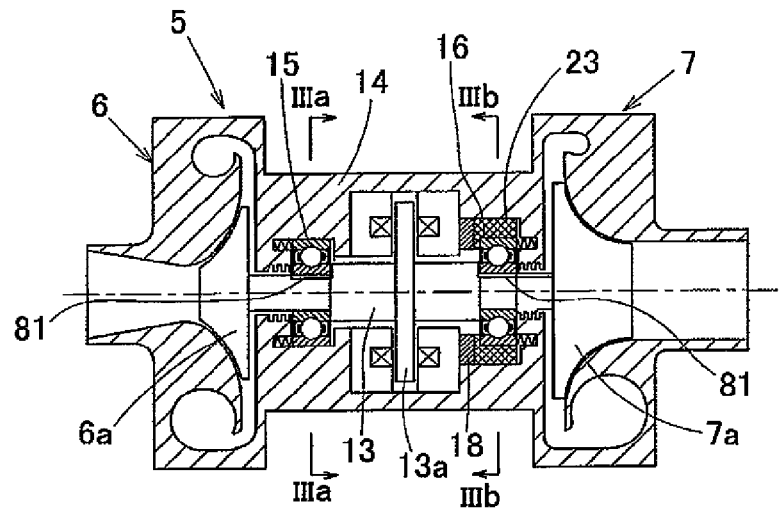
FIG. 3A is a schematic cross sectional diagram showing the turbine unit for air cycle refrigerating/cooling shown in FIG. 2.
Figure 3B:
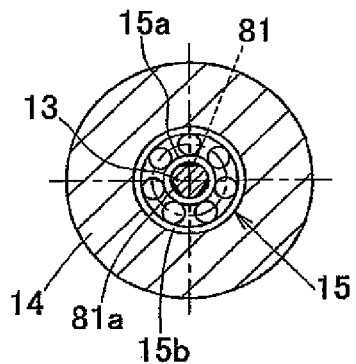
FIG. 3Ba is a cross sectional diagram along line IIIa-IIIa.
Figure 3C:
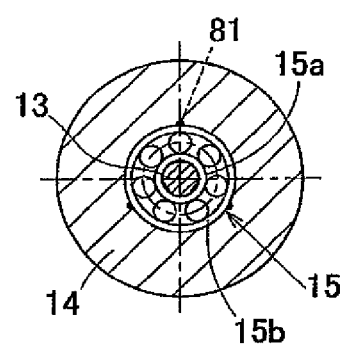
FIG. 3Ca is a cross sectional diagram showing a modification which corresponds to the cross sectional diagram along line IIIa-IIIa.
Figure 3D:
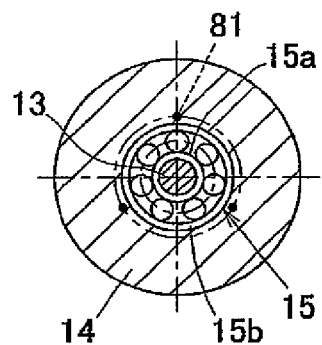
FIG. 3Da is a cross sectional diagram showing another modification which corresponds to the cross sectional diagram along line IIIa-IIIa.
Figure 3B:
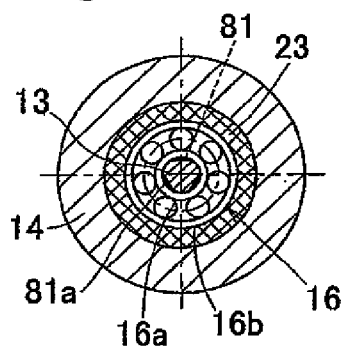
Figure 3C:
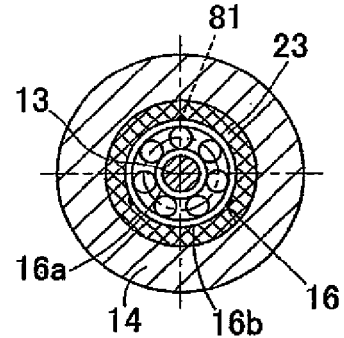
Figure 3D:
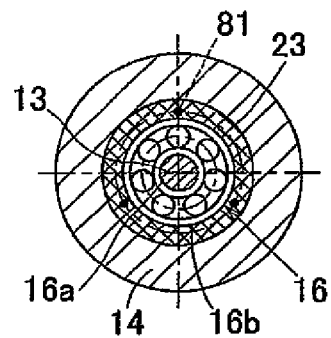

The pressure equalizing device 81 may be, for example, one example shown in FIGS. 3Ba and 3Bb, another example shown in FIGS. 3Ca and 3Cb or still another example shown in FIGS. 3Da and 3Db. FIGS. 3Ba and 3Bb are cross sectional diagrams along line IIIa-IIIa and line IIIb-IIIb in FIG. 3A, respectively. FIGS. 3Ca and 3Cb as well as FIGS. 3Da and 3Db show another modification and still another modification of the pressure equalizing device, respectively. In any case, a pressure equalizing device can easily be obtained.

In the example shown in FIG. 3B, the pressure equalizing device 81 are formed of a space between a non-circular portion 81a provided at contact portions of the inner ring 15a, 16a of the bearing 15 or 16 in the main shaft 13 and the inner surface of the inner ring 15a, 16a, respectively. In this example, the non-circular portions 81a are formed such that a part of the outer surface of the main shaft 13 is processed to a flat surface in three locations at equal intervals in the circumferential direction. The non-circular portions 81a may be of groove geometry.

In another example shown in FIGS. 3Ca and 3Cb, the pressure equalizing devices 81 are formed by communication passages provided in the spindle housing 14 and the bearing housing 23, respectively, which make contact with the outer rings 15b and 16b of the bearings 15 and 16. The communication passage is shown as a notch in groove geometry.

In still another example shown in FIGS. 3Da and 3Db, the pressure equalizing devices 81 are formed by communication passages provided in the spindle housing 14 in the axial direction for the bearing 15 on the side to which no sensor is attached and by communication passages provided in the bearing housing 23 in the axial direction for the bearing 16 on the side to which the sensor 18 is attached, respectively. The communication passage is shown as air vents made up of a through hole In the case where the pressure equalizing device 81 are provided as shown in the examples of these FIGS. 3Ba to 3Db, the pressure applied to opposite sides of the bearing 15 in the axial direction and the pressure applied to opposite sides of the bearing 16 are equalized, respectively, and thus, the grease within these bearings 15 and 16 can be prevented from dispersing and drying. That is to say, the main shaft 13 supported by the respective bearings 15 and 16 is provided with the respective rotors 6 and 7 rotating at high speed, and therefore, there is a great difference in the pressure applied to opposite sides, and this difference in the pressure causes air leak and invites the dispersion and drying of the grease even when the respective bearings 15 and 16 are sealed. Such a dispersion of the grease can be prevented by the pressure equalizing device 81.

It is to be noted that the pressure equalizing device 81 may be made up of air vents provided in the main shaft 13.

Figure 4:
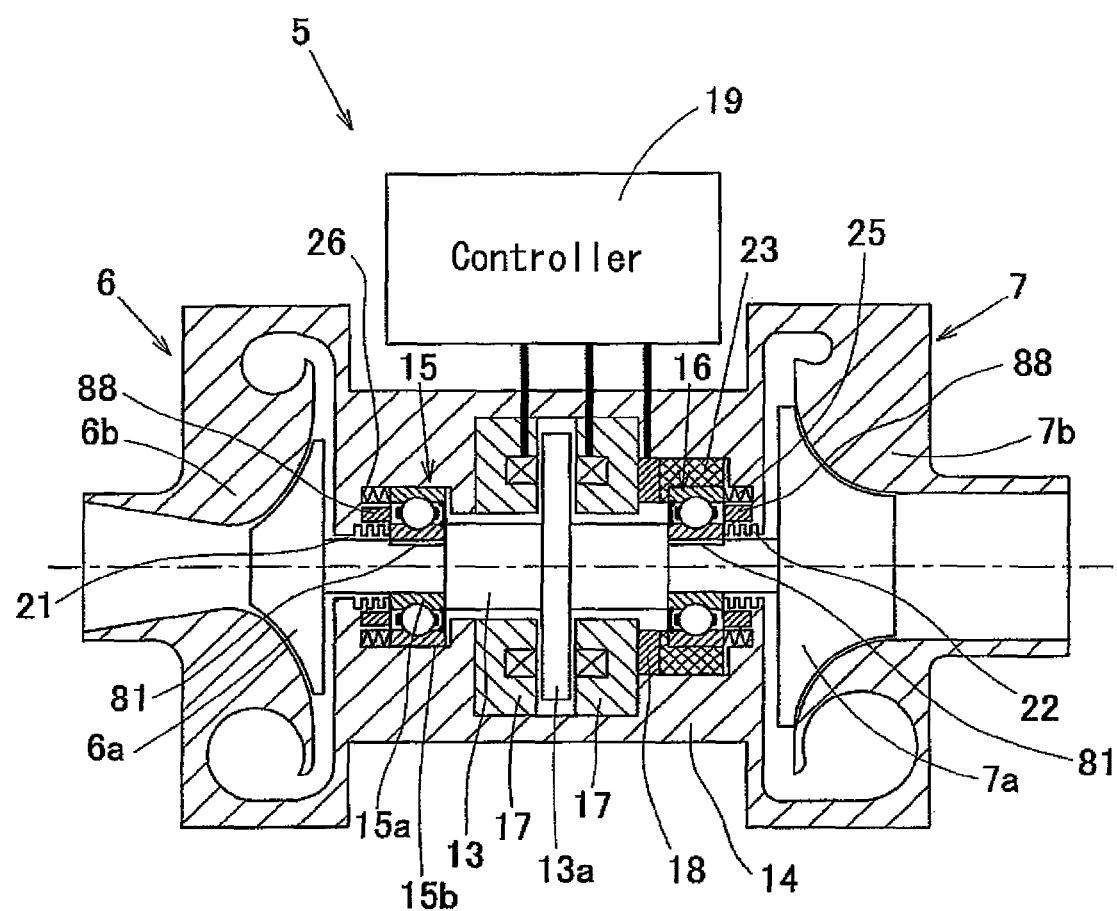
FIG. 4 is a cross sectional diagram showing the turbine unit for air cycle refrigerating/cooling according to the second embodiment.

FIG. 4 shows the turbine unit 5 according to the second embodiment. This turbine unit 5 is formed by providing grease chambers 88 in the vicinity of the bearings 15 and 16 in the embodiment shown in FIG. 2. The grease chambers 88 are provided in the spindle housing 14 so as to confront the annular bearing space defined between the inner and outer rings of the bearing 15, 16 and made up of circumferential grooves or recesses provided at a number of locations in the circumferential direction. The respective bearings 15 and 16 are provided without seals on the grease chamber 88 side and with seals on the side opposite thereto in the axial direction.

In the case where the grease chambers 88 are provided as above mentioned, the life of the grease is increased and the interval between regular maintenance work of the turbine unit 5 can be extended.

FIG. 5 shows the turbine unit 5 according to the third embodiment. This turbine unit 5 is provided with a motor 90 for rotating and driving the main shaft 13. The motor 90 is provided next to the electromagnet 17 in the axial direction and includes a stator 91 provided in the spindle housing 14 and a rotor 92 provided on the main shaft 13. The stator 91 has a stator coil 91a and the rotor 92 is made up of a magnet or the like. The motor 90 is controlled by a motor controller 93. The turbine unit 5 shown in FIG. 5 includes pressure equalizing device 81 in the same manner as shown in FIG. 3 and grease chambers 88 in the same manner as shown in FIG. 4.

In this turbine unit 5, the compressor rotor 6a is rotated and driven by the drive force generated by the turbine rotor 7a of the expansion turbine 7 and the drive force of the motor 90. Therefore, it is possible to drive the compressor 6 even without a pre-compressing unit 2 made up of a blower as shown in FIG. 1.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention.

Accordingly, such changes and modifications are, unless they depart from the scope of the present invention as delivered from the claims annexed thereto, to be constructed as included therein.

What is claimed is:

1. A turbine unit used in an air cycle refrigerating/cooling system comprising:
 a first heat exchanger for cooling air;
 a turbine unit comprising:
  a compressor for compressing the air; and
  an expansion turbine for adiabatically expanding the air;
 a second heat exchanger for cooling the air,
  wherein the first heat exchanger, the compressor, the second heat exchanger, and the expansion turbine are cooperatively connected in series by an air path, and
  wherein a compressor rotor of the compressor and a turbine rotor of the expansion turbine are attached to a common main shaft in the turbine unit in such a manner that the turbine unit drives the compressor rotor with a power generated by the turbine rotor, and wherein the main shaft is rotatably supported by a rolling contact bearing, and wherein part or the entirety of a thrust force applied to the main shaft is supported by an electromagnet; and a pressure equalizing device for equalizing gas pressures at opposite ends of the rolling contact bearing comprising:

(a) a first gap defined in a part of an outer surface of the main shaft between an inner ring of the rolling contact bearing and the main shaft, (b) a second gap provided between an outer ring of the rolling contact bearing and a first member in contact with the outer ring, or (c) a communication passage provided within the first member configured to make contact with the outer ring.

2. The turbine unit for air cycle refrigerating/cooling according to claim 1, further comprising:

a motor rotor attached to the main shaft; and a motor stator confronting the motor rotor, wherein the main shaft is rotated by a magnetic force generated by the motor stator and a power generated by the turbine rotor so as to drive the compressor rotor.

3. The turbine unit for air cycle refrigerating/cooling according to claim 1, wherein the rolling contact bearing is a type of grease lubricant.

4. The turbine unit for air cycle refrigerating/cooling according to claim 3, wherein a grease chamber is provided in a second member provided around the rolling contact bearing.

5. The turbine unit for air cycle refrigerating/cooling according to claim 1, further comprising a non-contact seal for restricting a leakage between the compressor and the turbine.

6. The turbine unit for air cycle refrigerating/cooling according to claim 1, wherein the pressure equalizing device comprises the first gap.

7. The turbine unit for air cycle refrigerating/cooling according to claim 6, wherein the main shaft has an outer surface provided with a non-circular portion, and the first gap is formed between the non-circular portion and an inner surface of the inner ring.

8. The turbine unit for air cycle refrigerating/cooling according to claim 7, wherein the non-circular potion is formed such that a part of the outer surface of the main shaft is processed to a flat surface or is of groove geometry.

9. The turbine unit for air cycle refrigerating/cooling according to claim 1, wherein the pressure equalizing device comprises the second gap.

10. The turbine unit for air cycle refrigerating/cooling according to claim 9, wherein the second gap is a notch is groove geometry.

11. The turbine unit for air cycle refrigerating/cooling according to claim 1, wherein the pressure equalizing device comprises the communication passage.

12. The turbine unit for air cycle refrigerating/cooling according to claim 11, wherein the communication passage is a through hole in an axial direction of the rolling contact bearing and is provided in a plurality of locations in the circumferential direction.

* * * * *